R. HOSKIN.

Assignor to I. N. Hebberd.

ROLLER FOR DRYING FLOOR CLOTHS.

No. 7,824. Reissued July 31, 1877.

WITNESSES;

F. Walter Fowler

Chas. A. Gill

INVENTOR

Robert Hoskin

By his attys.

Cox & Cox

UNITED STATES PATENT OFFICE.

ROBERT HOSKIN, OF CRANFORD, NEW JERSEY, ASSIGNOR TO ISAAC N. HEBBERD, OF NEW YORK CITY.

IMPROVEMENT IN ROLLERS FOR DRYING FLOOR-CLOTH.

Specification forming part of Letters Patent No. 65,223, dated May 28, 1867; Reissue No. 7,824, dated July 31, 1877; application filed July 17, 1877.

*To all whom it may concern:*

Be it known that I, ROBERT HOSKIN, formerly of Brooklyn, New York, now of Cranford, in the county of Union and State of New Jersey, have invented certain new and useful Improvements in Rollers for Drying, &c.; and I do hereby declare that the following is a full, clear, and exact description thereof, that will enable others skilled in the art to which it appertains to make and use the same, reference being had to the accompanying drawings, and to the letters of reference marked thereon, which form a part of this specification.

Figure 1:
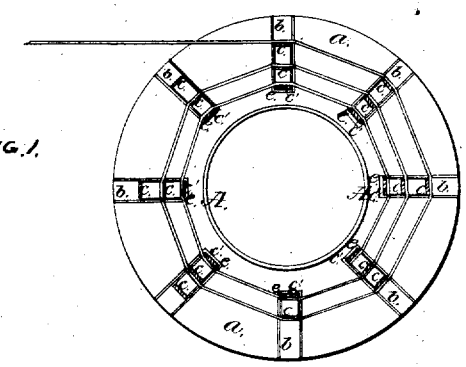
Figure 2:
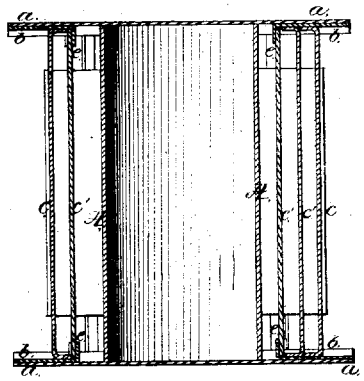
Figure 3:
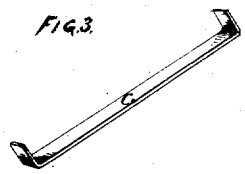

Figure 1 is a cross-section through the roller. Fig. 2 is a central longitudinal section through the same. Fig. 3 is a perspective view of one of the movable stretching-bars.

Similar letters of reference indicate corresponding parts in the several figures.

This invention relates to a new and improved roller, and is intended to economize in space by providing for rolling up the material so that the surfaces will not touch each other, instead of having it stretched upon long racks, as will be hereinafter described.

To enable others skilled in the art to understand my invention, I will describe its construction and operation.

In the accompanying drawings, A represents a drum, which may be made of any suitable length and diameter, and which has large circular heads or flanges *a a* applied to its ends, as shown in Figs. 1 and 2. On the inside surfaces of the flanges *a a* are a number of radial grooves, *b b*, for receiving the longitudinal stretching-bars *c′ c*, which are constructed with their ends bent at right angles, as shown in Figs. 2 and 3, for the purpose of separating or spacing them when applied within the grooves *b b*. The first set of bars, *c′*, or those which are nearest the cylinder A, are held firmly at the inner ends of their respective grooves by the stops *e*, and do not require to have their ends bent at right angles. The bars are all movable, and can be detached from the roller as the material is unwound from it.

The manner of applying the printed material upon the roller is as follows: The end of the material is attached, in any suitable manner, to one of the bars *c′*, which is then inserted into the longest one of the radial grooves *b*. The next bar *c′* is then inserted into the next groove, and the material drawn over it, and so on until the material has made one turn around the cylinder A, when the rods or bars *c* are used until the roller has been filled. It will be seen by reference to Fig. 1 that the material is wound upon the bars *c* and *c′* in a spiral or volute form, and that it touches only the stretching-bars, which are applied as the material is wound up.

By my invention the newly-painted surface of the material will not be blurred or injured in any manner in consequence of the material being wound upon a roller, as the surfaces are separated, and while this is the case it will be seen that freedom for ventilation is allowed in as perfect a manner as though the material were hung up or spread out upon a flat surface to dry. Rollers constructed in this manner can be mounted in bearings near a printing-table, and the material wound upon them as it is printed, after which the whole can be carried to the drying-room, and there allowed to remain until the paint is thoroughly dry.

What I claim as new, and desire to secure by Letters Patent, is—

1. An open rack arranged spirally about a drum or aperture, substantially as and for the purposes set forth.

2. A rack for drying material, composed of a number of adjustable arms, capable of being arranged in a volute or spiral manner, substantially as set forth.

3. The bar *c*, provided with the angular flanges, as and substantially for the purpose set forth.

4. The circular heads *a*, provided with the grooves *b* for receiving the bars *c*, substantially as specified.

In testimony that I claim the foregoing I have hereunto set my hand this 10th day of July, 1877.

ROBERT HOSKIN.

Witnesses:

STEPHEN CHANDLER,

OLSON J. IVES.